Figure 1:
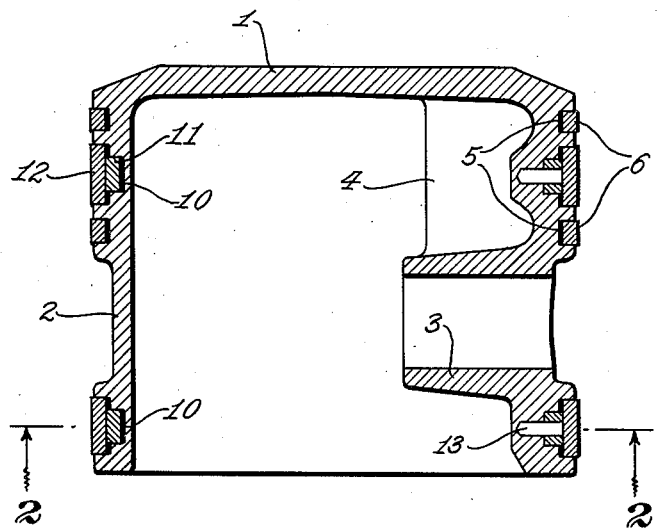

May 5, 1931.                J. FLAMMANG ET AL                1,803,387
                              TRUNK PISTON
                            Filed Oct. 8, 1927

Inventors:
JOHN FLAMMANG and PERCY L. BOWSER,
By John W. Bruninga
Their Attorney.

Patented May 5, 1931

1,803,387

UNITED STATES PATENT OFFICE

JOHN FLAMMANG, OF UNIVERSITY CITY, AND PERCY L. BOWSER, OF ST. LOUIS, MISSOURI, ASSIGNORS, BY MESNE ASSIGNMENTS, TO THE STERLING CORPORATION, OF WILMINGTON, DELAWARE, A CORPORATION OF DELAWARE

TRUNK PISTON

Application filed October 8, 1927. Serial No. 224,818.

This invention relates to pistons and more particularly to pistons which are used in internal combustion engines and which are of the trunk type in that the skirt of the piston forms the cross head.

In the operation of an internal combustion engine, the weight of the piston plays an important part in determining the operation of the engine and more particularly at high speeds. This is because the piston must be accelerated to a high speed and then stopped and reversed in its direction of movement. These reversals take place in very rapid succession. The inertia of the piston causes considerable vibration of and strain on the engine during these reversals of movement. It has been proposed to overcome this difficulty by constructing the piston of a light material so as to reduce its inertia to a minimum. The material most easily adapted to this purpose, on account of its lightness and its cheapness, is aluminum or its alloys. These materials, however, have a high co-efficient of thermal expansion so that under operating conditions the piston will expand more rapidly than the cylinder within which it is expected to work. This causes difficulty due to the liability of the piston binding in the cylinder on account of its expansion. If sufficient clearance is allowed between piston and cylinder to avoid binding, the piston becomes too loose for satisfactory operation when the engine is cool. Various means for overcoming this difficulty have been proposed, such as making the piston in such form as to be resilient.

One of the objects of this invention is to provide a piston which has a bearing in the cylinder, constructed and arranged in such a manner that the bearing diameter will be maintained constant irrespective of the temperature.

One of the features of this invention resides in the fact that the body of the piston has a base ring provided with a bearing face for a packing ring, but in which the diameter of the bearing face of the base ring on which the packing ring seats remains substantially constant as the piston body expands. In accordance with one embodiment of this invention, the base ring seats on the piston body opposite the wrist pin bearings, while the packing ring seats on the base ring on a diameter passing through the thrust side of the piston; there is clearance provided between the packing ring and the base ring opposite the wrist pin bearings, while there is clearance between the base ring and the body on the diameter passing through the thrust side of the piston. These clearances are made sufficient so that, when the body becomes fully expanded under the conditions encountered in the machine for which the piston is designed, they will be substantially taken up so that the seats or bearings of the base ring on the piston body and of the packing ring on the base ring extend substantially circumferentially around the piston.

Further objects will appear from the detail description, taken in connection with the accompanying drawings, in which—

Figure 2:
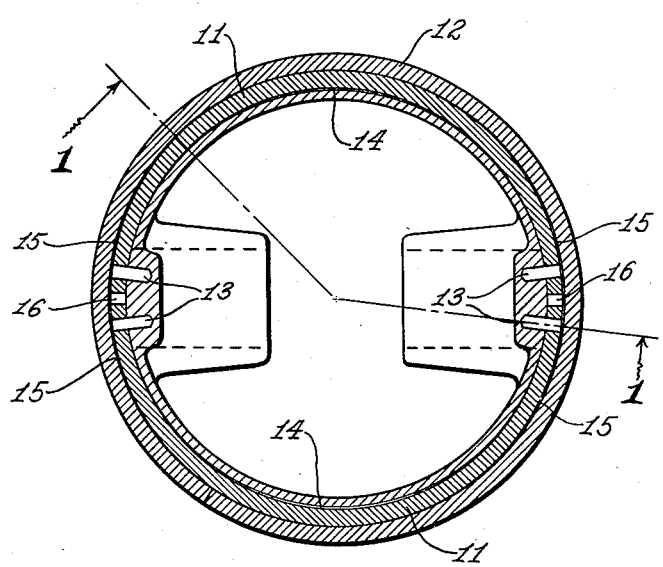

Figure 1 is a vertical section through a piston embodying this invention, taken on line 1—1 of Figure 2; and Figure 2 is a section on the line 2—2 of Figure 1.

Referring to the accompanying drawing, the piston is shown as of the trunk type, comprising a head 1 and a skirt 2 having wrist pin bearings 3 and ribs 4 connecting the latter with the head and the skirt. The piston may be of any suitable or usual construction and is usually cast of an aluminum alloy, although it will be understood that the piston may be cast of any other suitable material adapted for the purpose and use for which the piston is designed. The usual grooves 5 receiving packing rings 6 of any suitable form may be provided.

Formed in the piston are one or more grooves 10, which may be suitably spaced and positioned, and each is arranged to receive a base ring 11 and a packing ring 12 in accordance with this invention; if desired, the groove parts for receiving the packing rings may be enlarged, as shown. Since, however, the construction of the latter may be the same, a detail description of one will be sufficient. Seated in the groove 10 is the base ring, which in this particular embodiment is composed of sections or halves so as to form a split ring. This base ring may be made of any suitable material, and one especially suitable for this purpose is steel, although it will be understood that other materials may be used. The base ring is attached to the piston body opposite the wrist pin bearing bosses in any suitable manner, as by pins 13. The construction is such that clearing spaces are provided at 14 on a diameter passing through the thrust side of the piston, and at 15 opposite the wrist pin bearings. These clearances are made sufficient so that they will not be entirely taken up when the piston body expands from a cold to a hot condition in an ordinary internal combustion engine.

In accordance with one method of procedure embodying this invention, the ring 11 is formed with the internal diameter slightly smaller than that of the bottom of the groove 10. The outside diameter is made sufficiently larger than the inside diameter so as to provide for clearance, corresponding to but slightly in excess of the diametrical expansion of the piston body from a cold to a hot condition in an internal combustion engine. The ring is now split, as shown at 16, to provide two halves, and the splits placed on a diameter opposite the wrist pin bearings. The halves are now moved out (up and down, Figure 2) until the base rings firmly engage with a ring corresponding to a packing ring when in service in the cylinder for which it is designed; in that position the ends of the ring are firmly pinned to the piston body through the medium of the pins 13, which also serve to hold these ends firmly seated against the body at the bottom of the groove 10, especially since the inside diameter of the base ring is smaller than the diameter of the groove in which it is seated. There are thus provided the clearance spaces 14 and 15 previously referred to, and these clearance spaces will be substantially equal and slightly greater than the radial expansion of the piston body when used in an internal combustion engine. As a practical example, for a piston made of aluminum alloy having a steel base ring and a cast iron packing ring and of the diameter usually employed in automobile engines, the radial clearance will be about .004 inch.

There is thus provided a piston which will accomplish the purposes for which it is designed. When the piston is cold, the clearance spaces 14 and 15 will be at a maximum, and the split base ring will seat on and be attached to the piston body opposite the wrist pins, while the packing ring will seat on the base ring on a diameter passing through the thrust side of the piston. As now the piston body expands, the clearances 14 and 15 will decrease; the design is, however, such that these spaces will not be entirely, although nearly, closed under ordinary operating conditions in a machine for which the piston is designed. Accordingly, not only will the diameter of the bearing face of the base ring taken through the thrust side of the piston remain substantially constant, but this bearing face will become substantially cylindrical and cover practically the entire periphery after the piston heats up to a working temperature. Accordingly, not only will piston slap be eliminated, but the seating diameter of the bearing ring on which the packing ring seats will remain substantially constant as the piston body expands. With the given thickness of the packing ring, therefore, the piston will have a constant bearing fit in the cylinder for which it is designed; and by providing a base ring and a packing ring near the top and the bottom of the piston, the latter will be properly guided in the cylinder so that the bearing will be on the packing rings 12.

It will be understood that the packing rings 12 may be of any suitable or usual construction, and they are preferably of the split type and of cast iron, although they may be made of any other suitable material. While it is preferable to provide a base ring 11 and a bearing packing ring 12 at the skirt, this is not essential in all cases, for the bottom of the piston may be constructed in the usual manner and split in order to compensate for expansion of the metal. The packing rings 6 may be of any suitable or usual construction, and although they are placed on the opposite sides of the bearing packing ring 12, this is not essential.

While the invention is particularly applicable to trunk pistons for internal combustion engines, it is obvious that many of its features are capable of use in other pistons, etc. It will, furthermore, be understood that certain features, operations and sub-combinations are of utility and may be employed without reference to other features, operations and sub-combinations; that is contemplated by and is within the scope of the appended claims. It is, furthermore, obvious that various changes may be made in details, within the scope of the appended claims, without departing from the spirit of this invention. It is, therefore, to be understood that this invention is not to be limited to the specific details and operations shown and/or described.

Having thus described the invention, what is claimed is:

1. A piston comprising, a body, a base ring provided with a bearing face for a packing ring and fixed to said body at a point circumferentially removed from its thrust diameter, there being clearance between the piston body and the base ring on a diameter taken through the thrust side of the piston in order to compensate for expansion of the body.

2. A piston comprising, a body having wrist pin bearings, a base ring fixed to said body adjacent one of said bearings, a packing ring seated on said base ring, there being clearance between the piston body and the base ring on a diameter taken through the thrust side of the piston and there being clearance between the packing ring and the base ring on a diameter through the wrist pin bearings.

3. A piston comprising, a body having wrist pin bearings, a base ring seated on and fixed to the body opposite the wrist pin bearings and spaced from the body on a diameter passing through the thrust side, and a packing ring seated on said base ring on that diameter but spaced therefrom opposite the wrist pin bearings.

4. A piston comprising, a body, a split base ring attached to the body opposite the wrist pin bearings and spaced from the body on a diameter passing through the thrust side, and a packing ring seated on said base ring on that diameter but spaced therefrom opposite the wrist pin bearings.

5. A piston comprising, a body, a base ring seated thereon and split opposite the wrist pin bearings and spaced from the body on a diameter passing through the thrust side, and a packing ring seated on said base ring on that diameter but spaced therefrom opposite the wrist pin bearings.

6. A piston comprising, a body, a base ring split and attached to said body opposite the wrist pin bearings and spaced from the body on a diameter passing through the thrust side, and a packing ring seated on said base ring on that diameter but spaced therefrom opposite the wrist pin bearings.

7. A piston comprising, a body, a base ring seated thereon and expansible with said body opposite the wrist pin bearings and spaced from the body, on a diameter passing through the thrust side, and a packing ring seated on said base ring on that diameter but spaced therefrom opposite the wrist pin bearings.

8. A piston comprising, a body having a base ring provided with a bearing face for a packing ring, the bearing face diameter of the base ring taken through the thrust side of the piston being greater than the diameter thereof taken through the wrist pin bearings when the piston is cold.

9. A piston comprising, a body having fixed thereon a base ring provided with a bearing face for a packing ring, the inside diameter of the base ring taken through the thrust side of the piston being greater than the corresponding diameter of the body when the piston is cold.

10. A piston comprising, a body having a base ring provided with a bearing face for a packing ring, the bearing face diameter of the base ring taken through the thrust side of the piston being greater than the diameter thereof taken through the wrist pin bearings and the inside diameter of the base ring taken through the thrust side of the piston being greater than the corresponding diameter of the body when the piston is cold.

In testimony whereof we affix our signatures this 1st day of October, 1927.
JOHN FLAMMANG.
P. L. BOWSER.